(12) United States Patent
Holt

(10) Patent No.: US 8,090,926 B2
(45) Date of Patent: *Jan. 3, 2012

(54) HYBRID REPLICATED SHARED MEMORY

(75) Inventor: John M. Holt, Essex (GB)

(73) Assignee: Waratek Pty Ltd., Lindfield, NSW (AU)

(*) Notice: Subject to any disclaimer, the term of this patent is extended or adjusted under 35 U.S.C. 154(b) by 985 days.

This patent is subject to a terminal disclaimer.

(21) Appl. No.: 11/973,380

(22) Filed: Oct. 5, 2007

(65) Prior Publication Data

US 2008/0133871 A1 Jun. 5, 2008

Related U.S. Application Data

(60) Provisional application No. 60/850,537, filed on Oct. 9, 2006, provisional application No. 60/850,711, filed on Oct. 9, 2006.

(30) Foreign Application Priority Data

Oct. 5, 2006 (AU) ................. 2006905527
Oct. 5, 2006 (AU) ................. 2006905534

(51) Int. Cl.
*G06F 12/00* (2006.01)
*G06F 13/00* (2006.01)

(52) U.S. Cl. ........ 711/173; 711/100; 711/129; 711/154; 711/170

(58) Field of Classification Search ............. 711/100, 711/129, 153, 154, 170, 173
See application file for complete search history.

(56) References Cited

U.S. PATENT DOCUMENTS 4,969,092 A 11/1990 Shorter
5,214,776 A 5/1993 Bagnoli et al.
(Continued)

FOREIGN PATENT DOCUMENTS

EP 0969377 1/2000
(Continued)

OTHER PUBLICATIONS

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

(Continued)

*Primary Examiner* — Tuan V. Thai
(74) *Attorney, Agent, or Firm* — Pillsbury Winthrop Shaw Pittman LLP

(57) ABSTRACT

A multiple computer system with hybrid replicated shared memory is disclosed. The local memory (10, 20, ... 80) of each of the multiple computers M1, M2, ... Mn is partitioned into a first part (11, 21, ... 81) and a second part (12, 22, ... 82). Each of the first parts are identical and each of the second parts are independent. The total memory available to the system is the first memory part plus n times the second memory part, n being the total number of application running multiple computers.

8 Claims, 5 Drawing Sheets

U.S. PATENT DOCUMENTS

| | | | |
|---|---|---|---|
| 5,291,597 A | | 3/1994 | Shorter |
| 5,418,966 A | | 5/1995 | Madduri |
| 5,434,994 A | | 7/1995 | Shaheen et al. |
| 5,488,723 A | | 1/1996 | Baradel et al. |
| 5,544,345 A | | 8/1996 | Carpenter et al. |
| 5,568,609 A | | 10/1996 | Sugiyama et al. |
| 5,612,865 A | | 3/1997 | Dasgupta |
| 5,802,585 A | | 9/1998 | Scales et al. |
| 5,918,248 A | | 6/1999 | Newell et al. |
| 5,940,870 A | * | 8/1999 | Chi et al. ............... 711/206 |
| 6,049,809 A | | 4/2000 | Raman et al. |
| 6,131,113 A | * | 10/2000 | Ellsworth et al. ............ 709/213 |
| 6,148,377 A | | 11/2000 | Carter et al. |
| 6,163,801 A | | 12/2000 | O'Donnell et al. |
| 6,192,514 B1 | | 2/2001 | Lurndal |
| 6,226,671 B1 | * | 5/2001 | Hagersten et al. ............ 709/215 |
| 6,314,558 B1 | | 11/2001 | Angel et al. |
| 6,324,587 B1 | | 11/2001 | Trenbeath et al. |
| 6,327,630 B1 | | 12/2001 | Carroll et al. |
| 6,370,625 B1 | | 4/2002 | Carmean et al. |
| 6,389,423 B1 | | 5/2002 | Sakakura |
| 6,425,016 B1 | | 7/2002 | Banavar et al. |
| 6,571,278 B1 | | 5/2003 | Negishi et al. |
| 6,574,628 B1 | | 6/2003 | Kahn et al. |
| 6,574,674 B1 | | 6/2003 | May et al. |
| 6,611,955 B1 | | 8/2003 | Logean et al. |
| 6,625,751 B1 | | 9/2003 | Starovic et al. |
| 6,668,260 B2 | | 12/2003 | Zoltan |
| 6,757,896 B1 | | 6/2004 | Cohen et al. |
| 6,760,903 B1 | | 7/2004 | Morshed et al. |
| 6,775,831 B1 | | 8/2004 | Carrasco et al. |
| 6,779,093 B1 | | 8/2004 | Gupta |
| 6,782,492 B1 | | 8/2004 | Nakaso |
| 6,823,511 B1 | | 11/2004 | McKenney et al. |
| 6,862,608 B2 | | 3/2005 | Buhlman et al. |
| 6,954,794 B2 | | 10/2005 | Rudd et al. |
| 6,968,372 B1 | | 11/2005 | Thompson et al. |
| 7,010,576 B2 | | 3/2006 | Bae |
| 7,020,736 B1 | | 3/2006 | Cherukuri |
| 7,031,989 B2 | | 4/2006 | Elmendorf et al. |
| 7,047,341 B2 | | 5/2006 | Jung |
| 7,047,521 B2 | | 5/2006 | Bunnell |
| 7,058,826 B2 | | 6/2006 | Fung |
| 7,082,604 B2 | | 7/2006 | Schneiderman |
| 7,206,827 B2 | | 4/2007 | Viswanath et al. |
| 2002/0013889 A1 | * | 1/2002 | Schuster et al. ............ 711/203 |
| 2002/0016891 A1 | * | 2/2002 | Noel et al. ................. 711/153 |
| 2002/0199172 A1 | | 12/2002 | Bunnell |
| 2003/0004924 A1 | | 1/2003 | Williams |
| 2003/0005407 A1 | | 1/2003 | Hines |
| 2003/0067912 A1 | | 4/2003 | Mead et al. |
| 2003/0105816 A1 | | 6/2003 | Goswani |
| 2004/0073828 A1 | | 4/2004 | Bronstein |
| 2004/0093588 A1 | | 5/2004 | Gschwind et al. |
| 2004/0158819 A1 | | 8/2004 | Cuomo et al. |
| 2004/0163077 A1 | | 8/2004 | Dimpsey et al. |
| 2005/0039171 A1 | | 2/2005 | Avakian et al. |
| 2005/0086384 A1 | | 4/2005 | Ernst |
| 2005/0108481 A1 | | 5/2005 | Iyengar et al. |
| 2005/0240737 A1 | | 10/2005 | Holt |
| 2005/0257219 A1 | | 11/2005 | Holt |
| 2005/0262313 A1 | | 11/2005 | Holt |
| 2005/0262513 A1 | | 11/2005 | Holt |
| 2006/0020913 A1 | | 1/2006 | Holt |
| 2006/0080389 A1 | | 4/2006 | Powers et al. |
| 2006/0080514 A1 | * | 4/2006 | Newport ................. 711/153 |
| 2006/0095483 A1 | | 5/2006 | Holt |
| 2006/0143350 A1 | | 6/2006 | Miloushev et al. |
| 2006/0167878 A1 | | 7/2006 | Hartman |
| 2006/0242464 A1 | | 10/2006 | Holt |
| 2006/0253844 A1 | | 11/2006 | Holt |
| 2006/0265703 A1 | | 11/2006 | Holt |
| 2006/0265704 A1 | | 11/2006 | Holt |
| 2006/0265705 A1 | | 11/2006 | Holt |
| 2008/0072238 A1 | | 3/2008 | Monnie et al. |
| 2008/0189700 A1 | | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications on Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP'90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architeture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5—Retrieved from the internet URL:http//www.springerlink.com/content/5v 028411810p6m700/> ,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. Conf. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL: htp://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 Dated Mar. 5, 2009.

* cited by examiner

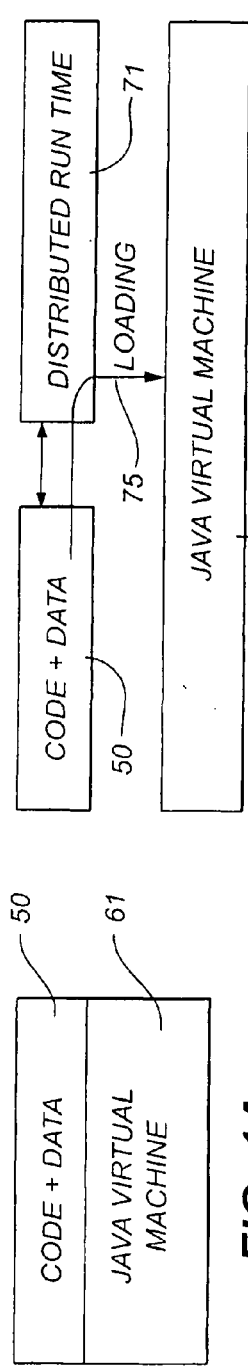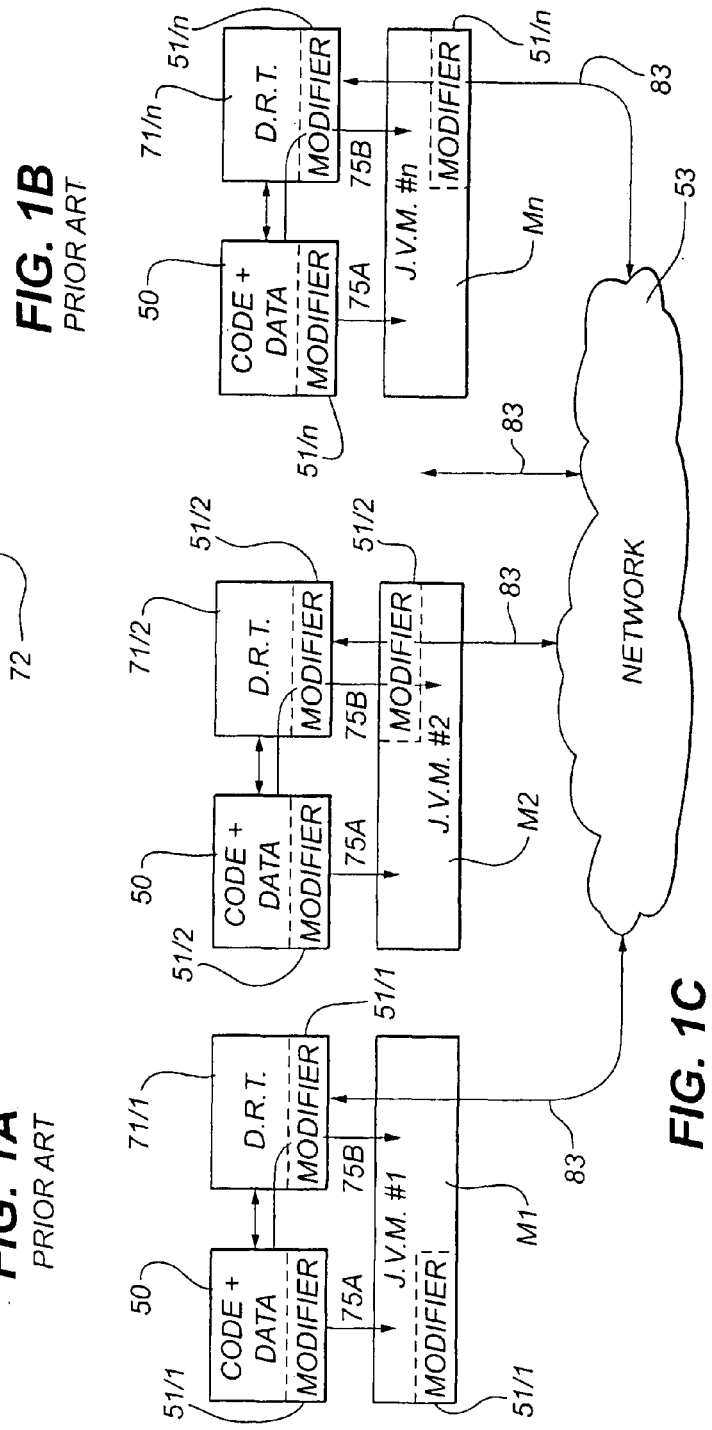
FIG. 1A PRIOR ART
FIG. 1B PRIOR ART
FIG. 1C

HYBRID REPLICATED SHARED MEMORY

CROSS-REFERENCE TO RELATED APPLICATIONS

The present application claims benefit under 35 USC 119(e) to copending U.S. Provisional Application Nos. 60/850,537 and 60/850,711, both filed 9 Oct. 2006. This application also claims priority under 35 USC 119(a)-(d) to Australian Provisional Application Nos. 2006905534 and 2006905527, both filed on 5 Oct. 2006, each of which are hereby incorporated herein by reference.

This application is related to concurrently filed U.S. application Ser. No. 11/973,374 entitled "Hybrid Replicated Shared Memory," now abandoned, and concurrently filed and allowed U.S. application Ser. No. 11/973,373 entitled "Hybrid Replicated Shared Memory," each of which are hereby incorporated herein by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 (WO 2006/110,937) to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 (WO 2006/110,957) both in the name of the present applicant and both unpublished as at the priority date of the present application, also disclose further details. The contents of the specification of each of the abovementioned prior application(s) are hereby incorporated into the present specification by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

Genesis of the Invention Non-commercial operation of a prototype multiple computer system indicates that not every machine or computer in the system utilises or needs to refer to (e.g. have a local copy of) every possible memory location. As a consequence, it is now realised that it is possible to operate a multiple computer system without the local memory of each machine being identical to every other machine, so long as the local memory of each machine is sufficient for the operation of that machine. That is to say, provided a particular machine does not need to refer to (for example have a local copy of) some specific memory locations, then it does not matter that those specific memory locations are not duplicated in that particular machine.

Briefly, it is known in the prior art that fragmentation is a phenomenon that leads to inefficiency in many forms of computer storage. Specifically, memory fragmentation is the phenomenon in which memory storage becomes divided into many small pieces over time. Memory fragmentation can occur for example when an application allocates and deallocates ("frees") regions of memory of varying sizes, thereby leaving the allocated and deallocated regions interspersed. The result is that, fragmented memory can potentially become effectively unusable because it is broken up into many pieces that are not close together.

Non-commercial operation of a multiple computer system prototype operating as a replicated shared memory arrangement has unexpectedly revealed that an application program operating in such arrangement for an extended period of time (such as for example, hours or even days of continuous operation) is susceptible to fragmentation between the replicated application memory locations/contents/values and the non-replicated application memory locations/contents/values of the local allocated application memories of each member machine making up the replicated shared memory arrangement.

It has further been revealed through operation of the abovementioned prototype that replicated memory locations/contents/values often "live" far longer on average than unreplicated application memory locations/contents/values. For example, replicated application memory locations/contents/values typically take the form of shared data structures and/or shared contents and/or shared values between plural threads of the application program, such as for example queues, lists, shared caches, and the like. Typically, such shared data structures and/or shared contents and/or shared values persist beyond the average life-cycle (duration) of single threads. Un-replicated application memory locations/contents/values, however, are characterised as not being shared between plural threads (for example, thread-local storage, thread-local variables, and other thread-private data structures etc), and therefore such un-replicated application memory locations/contents/values typically do not persist beyond the average life-cycle (duration) of a single thread.

The consequences of the above described differing characteristics of replicated application memory locations/contents and non-replicated application memory locations/contents leads to wide-spread fragmentation of the allocated application memory between the replicated application memory location/contents and the non-replicated application memory locations/contents. The problem of "fragmentation" of allocated application memory manifests in numerous ways, such as for example delayed or slow memory initialisation/allocation time, reduced effective application memory capacity, and decreased efficiency in serialising and de-serialising the contents of transmission and receipt of replica memory update transmissions due to replicated memory locations being stored in a non-contiguous and fragmented manner.

Investigation has revealed that the above described fragmentation problems arise due to the manner in which local replica application memory locations/contents/values are allocated or stored to the allocated application memory of individual machines. When replicated application memory contents/values are stored to allocated application memory in an uncoordinated and/or un-organised manner, or when prior art allocation and/or storage arrangements of single independent machines are used, fragmentation of allocated application memory will typically result when operated in a replicated shared memory arrangement. As at the priority date, no specific allocation and/or storage arrangement of replicated application memory locations/contents/values for multiple computer system of a replicated shared memory arrangement is known that reduces or minimises the incidences of fragmentation between replicated application memory locations/contents/values and non-replicated application memory locations/contents/values for "long-running" replicated shared memory systems.

SUMMARY OF THE INVENTION

In accordance with a first aspect of the present invention there is disclosed a multiple computer system with replicated shared memory, said system comprising a multiplicity of computers each interconnected via a communications network and each executing a different portion of an applications program written to be executed on only a single computer, wherein each said computer has an independent local memory partitioned into two regions, a first one of said regions being substantially similar with corresponding memory content replicated on at least one other computer, and the second of said regions not corresponding to each other.

In accordance with a second aspect of the present invention there is disclosed a method of partitioning an independent local memory of each computer of a multiple computer system comprising a multiplicity of computers each interconnected via a communications system and each executing a different portion of an applications program written to be executed on only a single computer, said method comprising the step of: (i) for each said computer partitioning the independent local memory into two regions, a first one of said regions being substantially similar with corresponding memory content replicated on at least one other computer, and the second of said regions not corresponding to each other.

In accordance with a third aspect of the present invention there is disclosed a single computer for operation in cooperation with an external multiple computer system with replicated shared memory, said system comprising a multiplicity of single computers each interconnected via a communications network and each executing a different portion of an applications program written to be executed on only a single computer, wherein each said single computer has an independent local memory partitioned into two regions, a first one of said regions being substantially similar with corresponding memory content replicated on at least one other computer, and the second of said regions not corresponding to each other.

In accordance with a fourth aspect of the present invention there is disclosed a method of partitioning local memory of a single computer operating in cooperation with a multiple computer system comprising a multiplicity of computers each interconnected via a communications network and each executing a different portion of an applications program written to be executed on only a single computer, said method comprising the step of: (i) partitioning the local memory of said single computer in two regions, a first one of said regions being substantially similar with corresponding memory content replicated on at least one other of said computers in the multiple computer system, and the second of said regions not corresponding to each other.

In accordance with a fifth aspect of the present invention there is disclosed a multiple computer system with replicated shared memory, said system comprising a multiplicity of computers each interconnected via a communications network and each executing a different portion of an applications program written to be executed on only a single computer, wherein each said computer has an independent local memory partitioned into an allocated application memory, said allocated application memory further partitioned into two regions, a first one of said regions comprising application memory contents replicated on at least one other of said computers and updated to remain substantially similar, and the second of said regions comprising application memory contents not replicated on any other of said computers and not updated to remain substantially similar.

In accordance with a sixth aspect of the present invention there is disclosed a method of partitioning an independent local memory of each computer of a multiple computer system comprising a multiplicity of computers each interconnected via a communications system and each executing a different portion of an applications program written to be executed on only a single computer, said method comprising the step of: (i) for each said computer partitioning the independent local memory into an allocated application memory, said allocated application memory further partitioned into two regions, a first one of said regions comprising application memory contents replicated on at least one other of said computers and updated to remain substantially similar, and the second of said regions comprising application memory contents not replicated on any other of said computers and not updated to remain substantially similar.

In accordance with a seventh aspect of the present invention there is disclosed a single computer for operation in cooperation with an external multiple computer system with replicated shared memory, said system comprising a multiplicity of single computers each interconnected via a communications network and each executing a different portion of an applications program written to be executed on only a single computer, wherein each said single computer has an independent local memory partitioned into an allocated application memory, said allocated application memory further partitioned into two regions, a first one of said regions comprising application memory contents replicated on at least one other of said computers and updated to remain substantially similar, and the second of said regions comprising application memory contents not replicated on any other of said computers and not updated to remain substantially similar.

In accordance with a eighth aspect of the present invention there is disclosed a method of partitioning local memory of a single computer operating in cooperation with a multiple computer system comprising a multiplicity of computers each interconnected via a communications network and each with an independent local memory and each executing a different portion of an applications program written to be executed on only a single computer, said method comprising the step of: (i) partitioning the local memory of said single computer into an allocated application memory, said allocated application memory further partitioned into two regions, a first one of said regions comprising application memory contents replicated on at least one other of said computers and updated to remain substantially similar, and the second of said regions comprising application memory contents not replicated on any other of said computers and not updated to remain substantially similar.

Thus the present invention discloses a beneficial method of storing and allocating replicated application memory locations/contents/values so as to substantially avoid or reduce fragmentation of the allocated application memory between replicated application memory locations/contents/values and non-replicated application memory locations/contents/values, of each machine.

Specifically, the present invention discloses a beneficial memory storage, memory layout, and memory allocation arrangement for replicated and non-replicated application memory contents and/or application memory values of a single application program being substantially simultaneously executed by a plurality of computers operating as a replicated shared memory arrangement.

BRIEF DESCRIPTION OF THE DRAWINGS

A preferred embodiment of the present invention will now be described with reference to the drawings in which:

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server.

DETAILED DESCRIPTION

Figure 2:
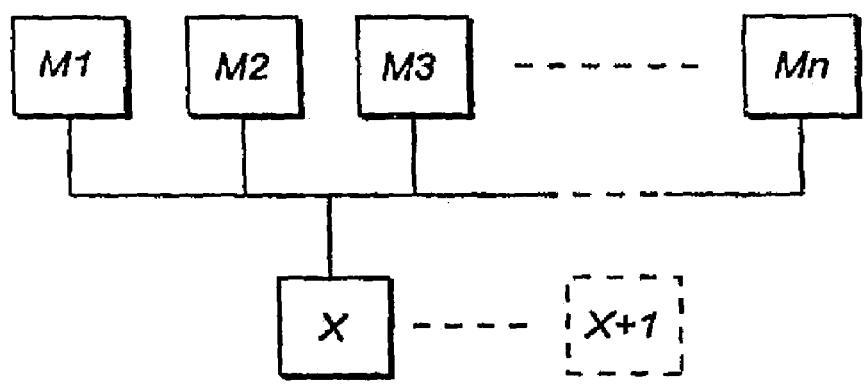
FIG. 2A is a schematic diagram of a replicated shared memory system.
FIG. 2B is an illustration of a partial or hybrid RSM system.
FIG. 2C is a diagram similar to that of FIG. 2B but of a partial or hybrid RSM system having five computers.
FIG. 2D illustrates a single physical machine providing several virtual machines.

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified by the present applicant by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, there is no restriction to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . .

71/*n* communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing the above described arrangements may optionally be connected to or coupled with other computers, machines, information appliances, or the like that do not implement the above described arrangements.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all arrangements).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some arrangements, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chipset. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term "compilation" normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one arrangement, the analysis or scrutiny of the application code 50 takes place during the loading of the application program code such as by the operating system reading the application code 50 from the hard disk or other storage device, medium or source and copying it into memory and preparing to begin execution of the application program code. In another arrangement, in a JAVA virtual machine, the analysis or scrutiny may take place during the class loading procedure of the java.lang.Class-Loader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code. All such modification routes are envisaged and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some arrangements this replicated memory structure will be identical. Whilst in other arrangements this memory structure will have portions that are identical and other portions that are not. In still other arrangements the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The arrangement is transport, network, and communications path independent, and does not depend on how the communication between machines or DRTs takes place. Even electronic mail (email) exchanges between machines or DRTs may suffice for the communications.

In connection with the above, it will be seen from FIG. 2 that there are a number of machines M1, M2, . . . Mn, "n" being an integer greater than or equal to two, on which the application program 50 of FIG. 1 is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the above described arrangement, if desired. However this would result in generally undesirable complexity. If the machine X is not provided then its functions, such as housekeeping functions, are provided by one, or some, or all of the other machines.

In FIG. 2A three machines are shown, of a total of "n" machines (n being an integer greater than one) that is machines M1, M2, . . . Mn. Additionally, a communications network 53 is shown interconnecting the three machines and a preferable (but optional) server machine X which can also be provided and which is indicated by broken lines. In each of the individual machines, there exists a memory 2A102 and a CPU 2A103. In each memory 2A102 there exists three memory locations, a memory location A, a memory location B, and a memory location C. Each of these three memory locations is replicated in a memory 2A102 of each machine.

This arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network 53. In International Patent Application No. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant, a technique is disclosed to detect modifications or manipulations made to a replicated memory location, such as a write to a replicated memory location A by machine M1 and correspondingly propagate this changed value written by machine M1 to the other machines M2 . . . Mn which each have a local replica of memory location A. This result is achieved by the preferred embodiment of detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

An alternative arrangement is that illustrated in FIG. 2B and termed partial or hybrid replicated shared memory (RSM). Here memory location A is replicated on computers or machines M1 and M2, memory location B is replicated on machines M1 and Mn, and memory location C is replicated on machines M1, M2 and Mn. However, the memory locations D and E are present only on machine M1, the memory locations F and G are present only on machine M2, and the memory locations Y and Z are present only on machine Mn. Such an arrangement is disclosed in International Patent Application No. PCT/AU2006/001447 published under WO 2007/041762 (and to which U.S. patent application Ser. No. 11/583,958). In such a partial or hybrid RSM systems changes made by one computer to memory locations which are not replicated on any other computer do not need to be updated at all. Furthermore, a change made by any one computer to a memory location which is only replicated on some computers of the multiple computer system need only be propagated or updated to those some computers (and not to all other computers).

Consequently, for both RSM and partial RSM, a background thread task or process is able to, at a later stage, propagate the changed value to the other machines which also replicate the written to memory location, such that subject to an update and propagation delay, the memory contents of the written to memory location on all of the machines on which a replica exists, are substantially identical. Various other alternative embodiments are also disclosed in the abovementioned prior art. Whilst the above prior art methods are adequate for application programs which write infrequently to replicated memory locations, the prior art method is prone to inherent inefficiencies in those application programs which write frequently to replicated memory locations.

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

With reference to FIG. 2C, where memory locations "A", "B", and "C" are replicated on three machines M1, M2, and M3 of a five machine replicated shared memory arrangement (comprising additional machines M4 and M5), then for the purposes of this invention the term replicated shared memory arrangement is not to be restricted to all 5 machines M1-M5, but may be also encompass any lesser plurality of machines (less than the total number of machines) in the operating arrangement, such as for example machines M1-M3. Thus, machines M1, M2 and M3 with replicated memory locations "A", "B" and "C" constitute a replicated shared memory arrangement in their own right (without machines M4 or M5).

Typically, the embodiments of replicated shared memory arrangements described and illustrated herein generally are made up from a plurality of independent machines with independent local memories such as that depicted in FIGS. 2A, 2B, and 2C. However, various alternative machine arrangements constituting a replicated shared memory system are provided by, and are included within the scope of, this invention.

Specifically, the term "machine" used herein to refer to a singular computing entity of a plurality of such entities operating as a replicated shared memory arrangement is not to be restricted or limited to mean only a single physical machine or other single computer system. Instead, the use of the term "machine" herein is to be understood to encompass and include within its scope a more broad usage for any "replicated memory instance" (or "replicated memory image", or "replicated memory unit") of a replicated shared memory arrangement.

Specifically, replicated shared memory arrangements as described herein include a plurality of machines, each of which operates with an independent local memory. Each such independent local memory of a participating machine within a replicated shared memory arrangement represents an "independent replicated memory instance" (whether partially replicated or fully replicated). That is, the local memory of each machine in a plurality of such machines operating as a replicated shared memory arrangement, represents and operates as an "independent replicated memory instance". Whilst the most common embodiment of such a "replicated memory instance" is a single such instance of a single physical machine forming some subset, or total of, the local memory of that single physical machine, "replicated memory instances" are not limited to such single physical machine arrangements only.

For example, it is provided by this invention to include within its scope any of various "virtual machine" or similar arrangements. One general example of a "virtual machine" arrangement is indicated in FIG. 2D. Such virtual machine arrangements may take the form of hypervisor or virtual machine monitor assisted arrangements such as VMWare virtual machine instances, or Xen paravirtualization instances. Alternative substantially equivalent virtual machine arrangements also include Solaris Containers, Isolated Software Domains, Parallel Operating System instances, substantially independent Application Processes or Tasks with independent and/or isolated and/or protected memories, or any other such independent virtual machine instance or such similar multi-program arrangement with an independent or isolated or protected memory. Those skilled in the computing arts will be familiar with various alternative "virtual machine" arrangements.

Utilising any of the various "virtual machine" arrangements, multiple "virtual machines" may reside on, or occupy, a single physical machine, and yet operate in a substantially independent manner with respect to the methods of this invention and the replicated shared memory arrangement as a whole. Thus, such "virtual machines" appear, function, and/or operate as independent physical machines, though in actuality they share, or reside on, a single common physical machine. Such an arrangement of "n" "virtual machines" 2D410 is depicted in FIG. 2D.

In FIG. 2D, a single physical machine 2D401 is indicated made up from hardware 2D402 and a hypervisor and/or operating system 2D403. Shown to be operating within machine 2D401 and above the hypervisor/operating system layer, are n "virtual machines" 2D410 (that is, 2D410/1, 2D410/2 . . . 2D410/n), each with a substantially independent, isolated and/or protected local memory (typically formed from some subset of the total memory of machine 2D401).

Each such "virtual machine" 2D410 for the purposes of this invention may constitute a single "replicated memory instance", which is able to behave as, and operate as, a "single machine" of a replicated shared memory arrangement.

When two or more such "virtual machines" reside on, or operate within, a single physical machine, then each such single "virtual machine" will typically represent a single "replicated memory instance" for the purposes of replicated shared memory arrangements. In otherwords, each "virtual machine" with a memory substantially independent of any other "virtual machine", when operating as a member of a plurality of "replicated memory instance" in a replicated shared memory arrangement, will typically represent and operate as a single "replicated memory instance", which for the purposes of this invention constitutes a single "machine" in the described embodiments, drawings, arrangements, description, and methods contained herein.

Thus, it is provided by this invention that a replicated shared memory arrangement, and the methods of this invention applied and operating within such an arrangement, may take the form of a plurality of "replicated memory instances", which may or may not each correspond to a single independent physical machine. For example, replicated shared memory arrangements are provided where such arrangements take the form of a plurality (such as for example 10) of virtual machine instances operating as independent "replicated memory instances", where each virtual machine instance operates within one common, shared, physical machine.

Alternatively for example, replicated shared memory arrangements are anticipated where such arrangements take the form of some one or more virtual machine instances of a single physical machine operating as independent "replicated memory instances" of such an arrangement, as well as some one or more single physical machines not operating with two or more "replicated memory instances".

Further alternatively arrangements of "virtual machines" are also provided and are to be included within the scope of the present invention, including arrangements which reside on, or operate on, multiple physical machines and yet represent a single "replicated memory instance" for the purposes of a replicated shared memory arrangement.

Figure 3:
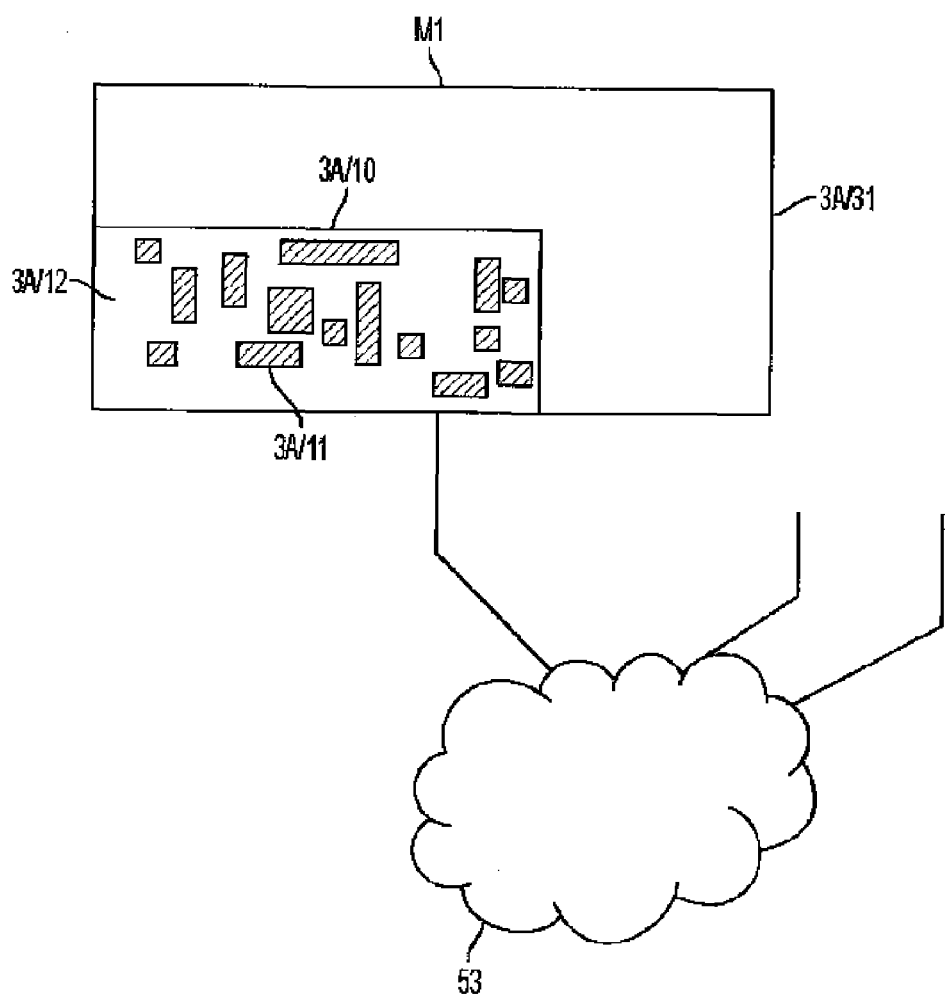
FIG. 3 illustrates fragmented memory within a single machine.

Turning now to FIG. 3, a schematic illustration of an allocated application memory of a single machine M1 which is "fragmented" between replicated application memory locations/contents/values and non-replicated application memory locations/contents/values, is shown. Specifically, FIG. 3 shows a prior art arrangement of the local memory 3A/31 of a single machine M1 operating as part of multiple computer system operating as a replicated shared memory arrangement. Within the local memory 3A/31 is an allocated application memory 3A/10. Specifically indicated is the fragmented arrangement of replicated application memory locations/contents/values 3A/11 (indicated as a plurality of single cross hatched boxes of various sizes and capacities) amongst the non-replicated application memory locations/contents/values 3A/12 within the allocated application memory 3A/10.

Figure 4:
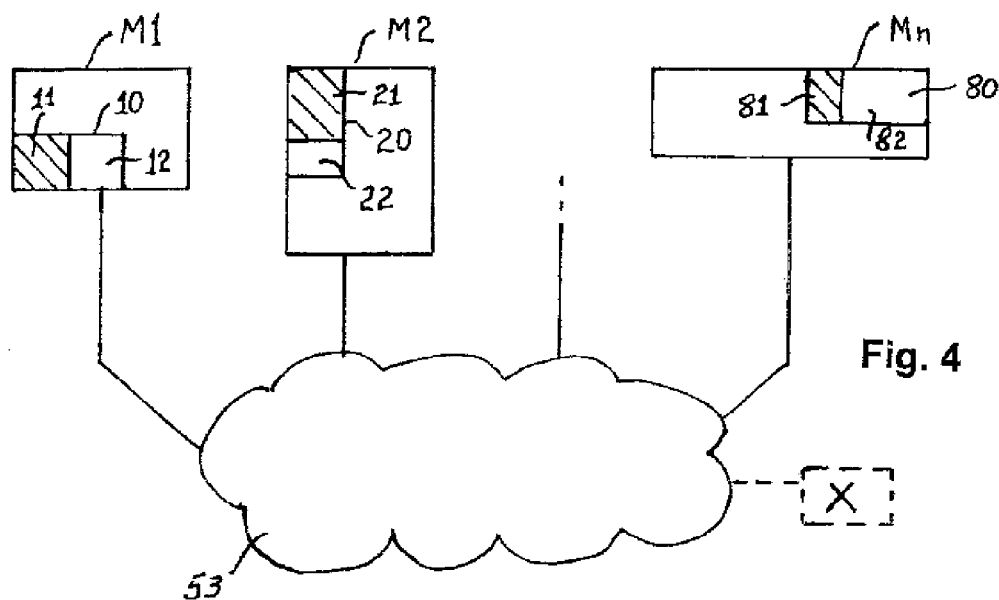
FIGS. 4-6 are each a schematic representation of the memory system of the preferred embodiment utilised in a multiple computer system.

In FIG. 4 a first preferred embodiment of the present invention is shown for storing replicated application memory locations/contents/values and non-replicated application memory locations/contents/values in allocated application memory. In FIG. 4 a number, "n", of application running computers or machines M1, M2, M3 . . . Mn operating as a replicated shared memory arrangement are provided and, if desired, a server machine X can also be provided. Since the server machine is not essential it is indicated in phantom in FIG. 4. All the machines M1-Mn, and X if present, are interconnected via a communications network such as a commodity communications network 53.

As schematically illustrated in FIG. 4, each of the computers M1, M2 . . . Mn has a local main memory 31,32, . . . 38 which can be, but need not be, the same size/capacity. Also schematically illustrated in FIG. 4, each of the computers M1, M2, . . . Mn has an allocated application memory 10, 20, . . . 80 which can be, but need not be, the same size/capacity. Each of the allocated application memories is partitioned into two regions namely a first replicated memory region 11, 21, 31, . . . 81 which is indicated by single cross hatching in FIG. 4 and a second non-replicated memory region 12, 22, . . . 82 which is preferably the remainder of the allocated application memory.

In the first replicated memory region 11, 21, . . . 81, each of the application memory locations/contents/values are essentially replicated on two or more of the machines M1, M2, . . . Mn so that substantially all the application memory location(s), content(s), value(s), variable(s), object(s), class(es), field(s), array(s), asset(s) etc located in the first replicated memory region 11, are duplicated/replicated in one or more of the other first replicated memory regions 21, . . . 81. Preferably all memory locations of the first replicated memory regions are application memory locations, and/or application memory values, and/or application memory contents of the application program and/or application program code, and accessible by (for example able to be read from and written to by) the application program and/or executing application program code.

Alternatively, non-application memory locations and/or non-application memory values and/or non-application memory contents may also reside in the replicated memory regions 11, 21, . . . 81. For example but not limited to, such non-application memory locations and/or non-application memory values and/or non-application memory contents may include non-application "count values" as disclosed in the present applicant's International Patent Application No. PCT/AU2007/001490 claiming priority from Australian Patent Application No. 2006 905 527 entitled "Advanced Contention Detection" and to which U.S. Patent Application No. 60/850,711 corresponds. The contents of the last mentioned two specifications are hereby incorporated into the present specification by cross-reference for all purposes.

Briefly stated, the abovementioned data protocol or message format includes both the address of a memory location where a value or content is to be changed, the new value or content, and a count number indicative of the position of the new value or content in a sequence of consecutively sent new values or content.

Thus a sequence of messages are issued from one or more sources. Typically each source is one computer of a multiple computer system and the messages are memory updating messages which include a memory address and a (new or updated) memory content.

Thus each source issues a string or sequence of messages which are arranged in a time sequence of initiation or transmission. The problem arises that the communication network 53 cannot always guarantee that the messages will be received in their order of transmission. Thus a message which is delayed may update a specific memory location with an old or stale content which inadvertently overwrites a fresh or current content.

In order to address this problem each source of messages includes a count value in each message. The count value indicates the position of each message in the sequence of messages issuing from that source. Thus each new message from a source has a count value incremented (preferably by one) relative to the preceding messages. Thus the message recipient is able to both detect out of order messages, and ignore any messages having a count value lower than the last received message from that source. Thus earlier sent but later received messages do not cause stale data to overwrite current data.

As explained in the abovementioned cross referenced specifications, later received packets which are later in sequence than earlier received packets overwrite the content or value of the earlier received packet with the content or value of the later received packet. However, in the event that delays, latency and the like within the network 53 result in a later received packet being one which is earlier in sequence than an earlier received packet, then the content or value of the earlier received packet is not overwritten and the later received packet is effectively discarded. Each receiving computer is able to determine where the latest received packet is in the sequence because of the accompanying count value. Thus if the later received packet has a count value which is greater than the last received packet, then the current content or value is overwritten with the newly received content or value. Conversely, if the newly received packet has a count value which is lower than the existing count value, then the received packet is not used to overwrite the existing value or content. In the event that the count values of both the existing packet and the received packet are identical, then a contention is signalled and this can be resolved.

This resolution requires a machine which is about to propagate a new value for a memory location, and provided that machine is the same machine which generated the previous value for the same memory location, then the count value for the newly generated memory is not increased by one (1) but instead is increased by more than one such as by being increased by two (2) (or by at least two). A fuller explanation is contained in the abovementioned cross referenced PCT specification.

Additionally, such non-application memory locations and/or non-application memory values and/or non-application memory contents may include (but are not limited to) non-application "resolution values" as disclosed in the last two mentioned specifications 60/850,711. Additionally again, such non-application memory locations and/or non-application memory values and/or non-application memory contents may include (but are not limited to) non-application "reachability tables"/"replication tables" as disclosed in International Patent Application No. PCT/AU2006/001447 (WO 2007/041762) claiming priority from Australian Patent Application No. 2006 905 582 entitled "Modified Machine Architecture with Partial Memory Updating" and filed 10 Oct. 2005 (to which U.S. patent application Ser. No. 11/583, 958 (60/730,543) corresponds) and in International Patent Application No. PCT/AU2006/001448 (WO 2007/041763) claiming priority from Australian Patent Application No. 2005 905 581 entitled "Modified Machine Architecture with Enhanced Memory Clean Up" also filed 10 Oct. 2005, (and to which U.S. patent application Ser. No. 11/583,991 (60/730, 408) corresponds). The contents of the two last mentioned PCT specifications are hereby incorporated into the present specification for all purposes.

When non-application memory locations, and/or non-application memory values, and/or non-application memory contents are stored in the replicated memory regions 11, 21, . . . 81, preferably such non-application memory locations/values/contents are inaccessible by the application program (such as for example being unable to be read from or written to by the executable code of the application program), or alternatively unaccessed by the application program (such as for example being unread or unwritten to by the executable code of the application program).

Various memory arrangements and methods for non-application accessible memory regions (that is, memory regions inaccessible to, or unaccessed by, an application program or application program code) are known in the prior art, such as using virtual memory, virtual memory pages, and memory management units (MMUs) to create memory spaces or memory regions or memory locations inaccessible to specific instructions or code (such as for example application program code). Other arrangements are also known in the prior art, such as through the use of namespaces, software or application domains, virtual machines, and segregated memory heaps, and all such memory partitioning, segregation, and/or memory access control methods and arrangements are included within the scope of the present invention.

Preferably, it is the application memory content(s) of the replicated memory regions 11,21, ..., 81 which are replicated, and not necessarily the physical or logical or functional or allocated application memory structure/arrangement and/or local memory structure/arrangement by which the replicated application memory content(s)/value(s) are stored in the local memories 31, 32, ... 38, allocated application memories 10,20, ... 80, or replicated memory regions 11, 21, ... 81. Specifically, the application memory layout, memory format, memory arrangement, and/or memory structure (including the local or virtual memory addresses) of the replicated memory locations of the first replicated memory region 11, 21, ... 81 of each machine M1, M2, ... Mn may take any form or format or arrangement or layout or structure, including potentially different forms or formats or arrangements or layouts or structures for each machine. When differing layouts (or forms, or formats, or arrangements, or structures) are utilised by replicated memory regions 11, 21, ... 81, preferably there is associated with corresponding replica memory locations/contents/values of each machine one or more consistent and/or common replica identifiers, or alternatively each machine M1, M2 ... Mn (or alternatively a machine X) maintains an association between each local replica memory location/content/value, and one or more corresponding replica memory locations/contents/values of one or more of the other machines. In addition, changes made by any machine of one of the replicated application memory location(s)/content(s) of its first replicated memory region, are communicated via the communications network 53 to the other ones of the multiple machines in which corresponding replicated memory location(s)/content(s) reside in the first replicated memory region(s).

Preferably, the replicated memory regions 11,21, ... 81 comprise a set of logically, or physically, or functionally contiguous or consecutive memory locations of the allocated application memory. For example, in one preferred embodiment, the replicated memory region 11 of machine M1 comprises a plurality of contiguous/consecutive local memory addresses (or virtual memory addresses), such as for example a range of memory addresses "17-24". In an alternative example, the replicated memory region 11 of machine M1 may take the form of a plurality of contiguous or consecutive virtual memory pages.

The second non-replicated memory region 12, 22, ... 82 of each of the local memories is independent and not replicated on any other machine, and thus the contents of the second non-replicated memory region are likely to be substantially dissimilar, and changes made to the content/values of a memory location of the second non-replicated memory region of any one of the computers M1, M2, ... Mn are not communicated to the other computers. Specifically, the memory locations of the second non-replicated memory region are not replicated memory locations on at least two machines of the multiple computer systems comprising machines M1 ... Mn. In this connection the disclosure of International Patent Application No. PCT/AU2006/001447 (WO 2007/041762) claiming priority from Australian Patent Application No. 2006 905 582 entitled "Modified Machine Architecture with Partial Memory Updating" and filed 10 Oct. 2005 (to which U.S. patent application Ser. No. 11/583,958 (60/730,543) corresponds) and International Patent Application No. PCT/AU2006/001448 (WO 2007/041763) claiming priority from Australian Patent Application No. 2005 905 581 entitled "Modified Machine Architecture with Enhanced Memory Clean Up" also filed 10 Oct. 2005, (and to which U.S. patent application Ser. No. 11/583,991 (60/730,408) corresponds) are incorporated herein by cross reference for all purposes.

Briefly those specifications describe a technique whereby either the computers M1, M2, ... Mn, themselves, or the server computer X if present, keep track of the creation, or deletion or placement of objects, fields, etc within the individual allocated application memories 10, 20, ... 80 and determine which of these require replication and updating and which do not.

Preferably, the second non-replicated memory regions 12,22, ... 82 are utilised for the non-replicated application memory locations/contents/values of each respective machine. Preferably, the non-replicated application memory locations/contents/values are logically, or physically, or functionally contiguous or consecutive memory locations/contents/values of the second non-replicated memory regions 12,22, ... 82 of the allocated application memory 10,20 ... 80. For example, in one preferred embodiment, the non-replicated memory region 12 of machine M1 takes the form of a plurality of contiguous or consecutive local memory addresses (or virtual memory addresses), such as for example a range of memory addresses "25-94". In an alternative example, the non-replicated memory region 12 of machine M1 takes the form of a plurality of contiguous or consecutive virtual memory pages. Optionally, the second non-replicated memory regions 12,22, ... 82 takes the form of any remaining allocated application memory which is not (or does not contain or include) replicated application memory locations/contents/values, such as for example including "free memory", "available memory", "unused memory", and "allocated but unused" memory.

In relation to the first replicated memory regions 11, 21, ... 81, from time to time the number of replicated application memory contents, values, objects, fields, arrays etc will increase, thereby resulting in a need for each of the computers M1, M2, ... Mn (or alternatively, only those computers on which any additionally replicated memory contents are to be replicated) to allocate more space to the first replicated memory region 11, 21, ... 81 to be used to store the additionally replicated application memory contents, values, objects, fields, arrays, etc. This is schematically illustrated in FIG. 4 by a double hatched area which constitutes an additional replicated memory region 13, 23, ... 83. Preferably, the additionally replicated memory regions 13, 23, ... 83 are allocated so as to be logically and/or physically and/or functionally contiguous or consecutive to the previous (first) replicated memory regions 11, 21, ... 81.

In one preferred embodiment of the present invention, the additional replicated regions 13, 23, ... 83 are allocated (or created, or initialised, or chosen) as a set of contiguous or consecutive memory addresses to the previous (first) replicated memory regions 11, 21, ... 81 in the allocated application memories 10,20, ... 80. For example, were the replicated memory region 11 of machine M1 to takes the form of the range of local memory addresses "17-24", then preferably the additional replicated memory region 13 of machine M1 would be allocated (or created, or initialised, or chosen) as contiguous or consecutive memory addresses of the range of memory addresses to the previous (first) replicated memory region 11—such as for example the range of memory addresses "25-31". In an alternative example, were the replicated memory region 11 of machine M1 to take the form of a plurality of virtual memory pages, then preferably the additional replicated memory region 13 of machine M1 would be allocated as contiguous or consecutive virtual memory pages to the plurality of contiguous/consecutive virtual memory pages of the previous (first) replicated memory region 11. Therefore, the allocation and/or storing (or creating, or initialising, or choosing) of additional replicated memory regions to be contiguous or consecutive with a previously replicated memory region, may be considered to logically, physically, or functionally expand the previous replicated memory region, and together the previous replicated memory region and the additional replicated memory region preferably take the form of a single contiguous or consecutive replicated memory region.

In an embodiment where the size of each of the allocated application memories 10, 20, . . . 80 remains constant (or is to remain constant), then growth of the first replicated memory regions 11, 21, . . . 81 (such as by the addition of the additional replicated memory regions 13, 23, . . . 83) will cause the second non-replicated memory regions 12, 22, . . . 82 to shrink to a corresponding extent. In such an embodiment as described above, preferably any "free memory", or "unused memory", or "available" memory, or "allocated but unused" memory of the second memory region which is contiguous or consecutive to the previous (first) replicated memory region is preferably used for such additional replicated memory region. Alternatively, "occupied memory", "used memory", "unavailable memory", or other "allocated and used" memory of the second non-replicated memory region which is logically, or physically, or functionally contiguous or consecutive to the previous (first) replicated memory region, may be moved or relocated or copied to a different position/location/place within the second non-replicated memory region, so as to make available the previously occupied (or used or unavailable) contiguous or consecutive memory of the second non-replicated memory region for the additional replicated memory region(s).

Additionally, non-commercial operation of a prototype multiple computer system operating as a replicated shared memory arrangement has revealed that typically an increase in the amount of replicated memory of an application program operating in a replicated shared memory arrangement corresponds to a reduction (either of the same amount, or a lesser amount) in the amount of non-replicated application memory utilised. Therefore, the abovedescribed allocation (or creation, or initialisation, or choosing) method is advantageous for application programs which exhibit such abovementioned characteristics. Additionally, such an allocation (or creation, or initialisation) arrangement as described above is therefore advantageous where allocated application memory 10,20, . . . 80 remains constant (or is to remain constant).

However, in an alternative embodiment of the present invention, it is also possible to adjust the size of the local application memories 10, 20, . . . 80 so that if, for example, the first replicated memory regions 11, 21, . . . 81 grow in size, this growth is accommodated by growth of the local application memories 10,20, . . . 80, and the size of the second memory regions 12, 22, . . . 82 remain unaltered. When such an alternative arrangement as this is employed, and additional application memory is to be allocated for the additional replicated memory 13,23, . . . 83, preferably such additionally allocated (or created, or initialised, or chosen) application memory is contiguous or consecutive to the first (previous) replicated memory region 11,21, . . . 81. For example, in one preferred embodiment, the additionally allocated application memory to be used for the additional replicated memory region 13 of machine M1 comprises a plurality of contiguous or consecutive local memory addresses (or virtual memory addresses), such as for example a range of memory addresses "10-16", which are contiguous or consecutive to the local memory addresses of the previous (first) replicated memory region 11 of machine M1 (e.g. the range of memory addresses "17-24"). In an alternative example, the additionally allocated application memory to be used for the additional replicated memory region 13 of machine M1 take the form of a plurality of contiguous or consecutive virtual memory pages. Other local memory size adjustments and control schemes can additionally, or alternatively, be applied.

Regardless of from where the local memory to be used as the additional replicated memory regions 13,23, . . . 83 is sourced (that is, whether such memory is additionally allocated application memory, or whether such memory was previously part of the second non-replicated memory region), the additional replicated memory regions 13, 23, . . . 83 are logically, or physically, or functionally contiguous or consecutive to the previous (first) replicated memory regions 11, 21, . . . 81. Together, the additional replicated memory regions 13,23, . . . 83, and the previous (first) replicated memory region 11,21, . . . 81, take the form of or constitute the replicated application memory contents/values, which are preferably stored and/or arranged in a contiguous or consecutive manner (or form, or format, or layout). Thus, fragmentation between replicated application memory locations/contents/values and non-replicated application memory locations/contents/values of allocated application memory is reduced, and efficient operation of the allocated application memories is achieved.

It follows from the above that the abovedescribed arrangement reduces the likelihood of fragmentation of the allocated application memory occurring between the replicated memory locations/contents and non-replicated application memory locations/contents therein.

Preferably there is a single replicated memory region 11,21, . . . 81 of machines M1,M2 . . . Mn, however more than one replicated memory region per allocated application memory is provided or may be required—such as for example, two replicated memory regions which are non-contiguous or non-consecutive with each other. Specifically, it may not always be possible to allocate or store all replicated application memory locations/contents/values in a single contiguous or consecutive memory region (such as the single replicated memory regions 11,21, . . . 81). However, when such is the case, the above methods still apply, where "uncontrolled" fragmentation between replicated application memory locations/contents/values and non-replicated application memory locations/contents/values is sought to be minimised, reduced, or avoided altogether.

When more than one replicated memory region 11,21, . . . 81 exists in allocated application memory, preferably such multiple replicated memory regions take the form of regions of contiguous or consecutive memory locations and/or addresses etc. When multiple replicated memory regions exist within an allocated application memory 10, 20, . . . 80, preferably any additional replicated memory regions (such as the additional replicated memory region 13, 23, . . . 83) are allocated or stored contiguously to, or consecutively to, at least one of the previous replicated memory regions. Consequently, in doing so the number of independent replicated memory regions and/or independent replicated memory locations is kept to the minimum possible in number, by always seeking to allocate or store (or create, or initialise, or chose) additional replicated application memory location/contents/values so as to be contiguous or consecutive to at least one of the previous replicated memory regions.

Figure 5:
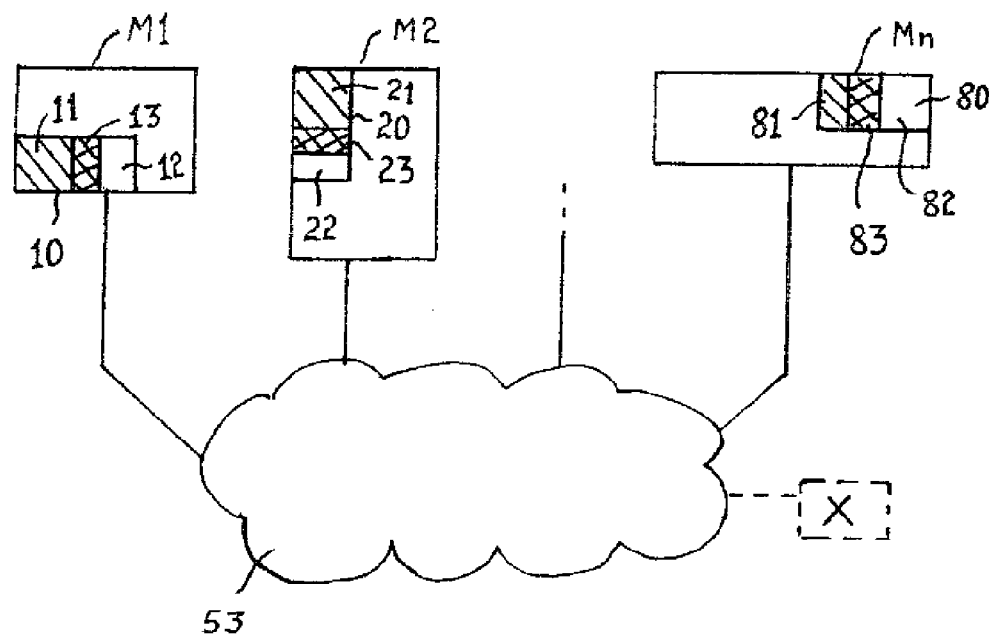
Figure 6:
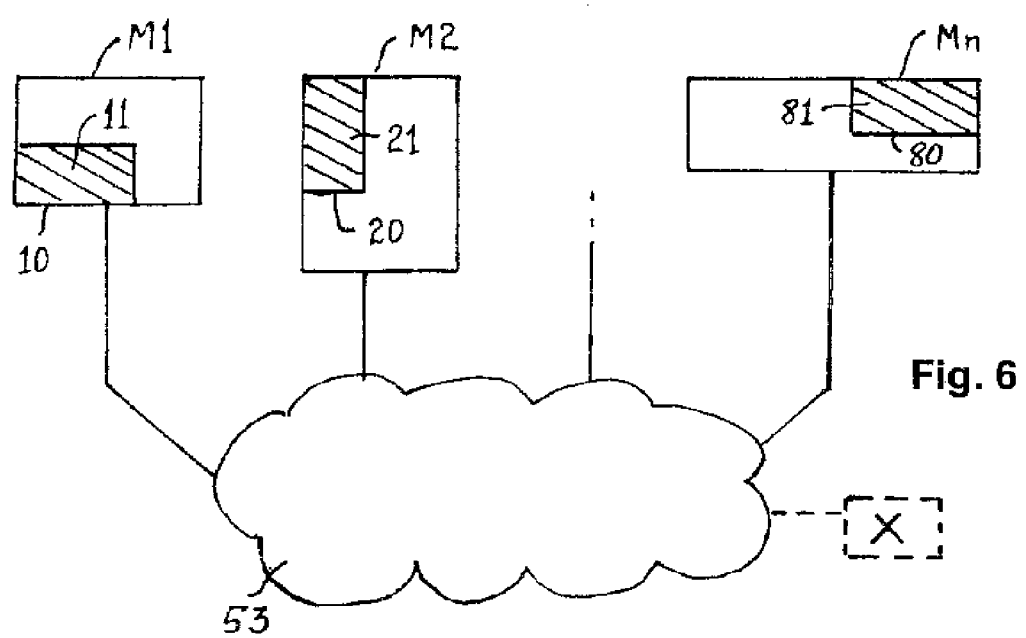

It is even possible as indicated in FIG. 5 for the first parts 11, 21, . . . 81 to constitute substantially all of the individual local memories 10, 20, . . . 80 as indicated in FIG. 5. This situation is further described in the abovementioned patent applications.

Each of the individual computers M1, M2, . . . Mn can be a different computer manufactured by a different manufacturer and having, for example, a different operating system, a different processor, etc and this is schematically indicated in FIGS. 3-5 by the arrangement of each of the local memories 10, 20, . . . 80 being different. For example, different computers can have different memory formats (such as Big Endian and Little Endian conventions, for example). Additionally, or alternatively, the way in which the allocated application memory is partitioned can also be different for each machine (as schematically illustrated in FIGS. 3-5).

Practical experience on a non-commercial prototype multiple computer system indicates that the volume of the replicated memory region 11, 21, . . . 81 (and including any additionally allocated contiguous replicated memory regions, such as additionally replicated memory region 13,23, . . . 83) is typically less than approximately half the corresponding local memory 10, 20, . . . 80 and usually within the range of approximately 5% to approximately 40% of the local memory. Typically, the replicated memory regions 11, 21, . . . 81 occupies from 10% to 30% of the local memory. The below examples indicate some test results for particular embodiments of the invention but are not limitations on the invention.

If, for ease of exemplification, each total local memory 10, 20, . . . 80 is assumed to be 100 Megabytes, then in an idealised distributed shared memory arrangement, the total memory available to the multiple computer system assuming eight machines would be 800 Megabytes. Conversely, in an idealised replicated shared memory system the total memory available would be only 100 Megabytes. However, in the hybrid replicated shared memory system as described in FIG. 3B, if the memory allocated to the first part 11, 21, . . . 81 is 10% or 10 Megabytes and thus the memory allocated to the second part 12, 22, . . . 82 is 90 Megabytes, then the total memory available to the system is the sum of the memory allocated to the first part (10 Megabytes) plus the number of machines in the multiple computer system times the memory allocated to the second part, or 10+(8×90) Megabytes=730 Megabytes. This represents 730/800 or 91.25% of the idealised distributed shared memory. Conversely, if under the same arrangements the percentage of local memory allocated to the first part 11, 21, . . . 81 rises to 30% and thus occupies 30 Megabytes, then the total memory available to the multiple computer system is 30+(8×70) Megabytes=590 Megabytes or 590/800 or 73.75% of the idealised distributed shared memory.

It follows from the above that the abovedescribed arrangement enables an appreciable percentage of the idealised distribution shared memory to be available to a multiple computer system as a result of the hybrid replicated shared memory arrangement described herein.

It is to be understood that the independent local memory 10, 20, . . . 80 of each machine represents only that of the machine's total memory which is allocated to that portion of the application program running on that machine. Thus other memory will be occupied by the machine's operating system and other computational tasks unrelated to the application program.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

The term "distributed runtime system", "distributed runtime", or "DRT" and such similar terms used herein are intended to capture or include within their scope any application support system (potentially of hardware, or firmware, or software, or combination and potentially comprising code, or data, or operations or combination) to facilitate, enable, and/or otherwise support the operation of an application program written for a single machine (e.g. written for a single logical shared-memory machine) to instead operate on a multiple computer system with independent local memories and operating in a replicated shared memory arrangement. Such DRT or other "application support software" may take many forms, including being either partially or completely implemented in hardware, firmware, software, or various combinations therein.

The methods of this invention described herein are preferably implemented in such an application support system, such as DRT described in International Patent Application No. PCT/AU2005/000580 published under WO 2005/103926 (and to which U.S. patent application Ser. No. 111/111,946 corresponds), however this is not a requirement of this invention. Alternatively, an implementation of the methods of this invention may comprise a functional or effective application support system (such as a DRT described in the abovementioned PCT specification) either in isolation, or in combination with other softwares, hardwares, firmwares, or other methods of any of the above incorporated specifications, or combinations therein.

The reader is directed to the abovementioned PCT specification for a full description, explanation and examples of a distributed runtime system (DRT) generally, and more specifically a distributed runtime system for the modification of application program code suitable for operation on a multiple computer system with independent local memories functioning as a replicated shared memory arrangement, and the subsequent operation of such modified application program code on such multiple computer system with independent local memories operating as a replicated shared memory arrangement.

Also, the reader is directed to the abovementioned PCT specification for further explanation, examples, and description of various anticipated methods and means which may be used to modify application program code during loading or at other times.

Also, the reader is directed to the abovementioned PCT specification for further explanation, examples, and description of various methods and means which may be used to modify application program code suitable for operation on a multiple computer system with independent local memories and operating as a replicated shared memory arrangement.

Finally, the reader is directed to the abovementioned PCT specification for further explanation, examples, and description of various methods and means which may be used to operate replicated memories of a replicated shared memory arrangement, such as updating of replicated memories when one of such replicated memories is written-to or modified.

The term "array", "array data structure", "array data type" and such similar terms used herein are intended to capture or include within their scope any set of memory locations, where such set is preferably a logically related or contiguous or consecutive or neighbouring set of memory locations. Importantly, such logically related or contiguous memory locations are not required to in actuality be contiguous or consecutive or neighbouring memory locations within the local memory of a machine (such as for example occupying physically contiguous, neighbouring, consecutive or related bits or bytes of a memory circuit or memory chip), but instead that for the purposes of the operation of a loop structure or other loop code-sequence of an application program code, the set of memory locations appear functionally and/or logically contiguous and/or consecutive and/or neighbouring and/or related memory locations.

In alternative multicomputer arrangements, such as distributed shared memory arrangements and more general distributed computing arrangements, the above described methods may still be applicable, advantageous, and used. Specifically, any multi-computer arrangement where replica, "replica-like", duplicate, mirror, cached or copied memory locations exist, such as any multiple computer arrangement where memory locations (singular or plural), objects, classes, libraries, packages etc are resident on a plurality of connected machines and preferably updated to remain consistent, then the methods are applicable. For example, distributed computing arrangements of a plurality of machines (such as distributed shared memory arrangements) with cached memory locations resident on two or more machines and optionally updated to remain consistent comprise a functional "replicated memory system" with regard to such cached memory locations, and is to be included within the scope of the present invention. Thus, it is to be understood that the aforementioned methods apply to such alternative multiple computer arrangements. The above disclosed methods may be applied in such "functional replicated memory systems" (such as distributed shared memory systems with caches) mutatis mutandis.

It is also provided and envisaged that any of the described functions or operations described as being performed by an optional server machine X (or multiple optional server machines) may instead be performed by any one or more than one of the other participating machines of the plurality (such as machines M1, M2, M3 ... Mn of FIG. 2A or 2B).

Alternatively or in combination, it is also further provided and envisaged that any of the described functions or operations described as being performed by an optional server machine X (or multiple optional server machines) may instead be partially performed by (for example broken up amongst) any one or more of the other participating machines of the plurality, such that the plurality of machines taken together accomplish the described functions or operations described as being performed by an optional machine X. For example, the described functions or operations described as being performed by an optional server machine X may broken up amongst one or more of the participating machines of the plurality.

Further alternatively or in combination, it is also further provided and envisaged that any of the described functions or operations described as being performed by an optional server machine X (or multiple optional server machines) may instead be performed or accomplished by a combination of an optional server machine X (or multiple optional server machines) and any one or more of the other participating machines of the plurality (such as machines M1, M2, M3 ... Mn), such that the plurality of machines and optional server machines taken together accomplish the described functions or operations described as being performed by an optional single machine X. For example, the described functions or operations described as being performed by an optional server machine X may broken up amongst one or more of an optional server machine X and one or more of the participating machines of the plurality.

The terms "object" and "class" used herein are derived from the JAVA environment and are intended to embrace similar terms derived from different environments, such as modules, components, packages, structs, libraries, and the like.

The use of the term "object" and "class" used herein is intended to embrace any association of one or more memory locations. Specifically for example, the term "object" and "class" is intended to include within its scope any association of plural memory locations, such as a related set of memory locations (such as, one or more memory locations comprising an array data structure, one or more memory locations comprising a struct, one or more memory locations comprising a related set of variables, or the like).

Reference to JAVA in the above description and drawings includes, together or independently, the JAVA language, the JAVA platform, the JAVA architecture, and the JAVA virtual machine. Additionally, the present invention is equally applicable mutatis mutandis to other non-JAVA computer languages (including for example, but not limited to any one or more of, programming languages, source-code languages, intermediate-code languages, object-code languages, machine-code languages, assembly-code languages, or any other code languages), machines (including for example, but not limited to any one or more of, virtual machines, abstract machines, real machines, and the like), computer architectures (including for example, but not limited to any one or more of, real computer/machine architectures, or virtual computer/machine architectures, or abstract computer/machine architectures, or microarchitectures, or instruction set architectures, or the like), or platforms (including for example, but not limited to any one or more of, computer/computing platforms, or operating systems, or programming languages, or runtime libraries, or the like).

Examples of such programming languages include procedural programming languages, or declarative programming languages, or object-oriented programming languages. Further examples of such programming languages include the Microsoft.NET language(s) (such as Visual BASIC, Visual BASIC.NET, Visual C/C++, Visual C/C++.NET, C#, C#.NET, etc), FORTRAN, C/C++, Objective C, COBOL, BASIC, Ruby, Python, etc.

Examples of such machines include the JAVA Virtual Machine, the Microsoft.NET CLR, virtual machine monitors, hypervisors, VMWare, Xen, and the like.

Examples of such computer architectures include, Intel Corporation's x86 computer architecture and instruction set architecture, Intel Corporation's NetBurst microarchitecture, Intel Corporation's Core microarchitecture, Sun Microsystems' SPARC computer architecture and instruction set architecture, Sun Microsystems' UltraSPARC III microarchitecture, IBM Corporation's POWER computer architecture and instruction set architecture, IBM Corporation's POWER4/POWER5/POWER6 microarchitecture, and the like.

Examples of such platforms include, Microsoft's Windows XP operating system and software platform, Microsoft's Windows Vista operating system and software platform, the Linux operating system and software platform, Sun Microsystems' Solaris operating system and software platform, IBM Corporation's AIX operating system and software platform, Sun Microsystems' JAVA platform, Microsoft's.NET platform, and the like.

When implemented in a non-JAVA language or application code environment, the generalized platform, and/or virtual machine and/or machine and/or runtime system is able to operate application code 50 in the language(s) (including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

In the JAVA language memory locations include, for example, both fields and elements of array data structures. The above description deals with fields and the changes required for array data structures are essentially the same mutatis mutandis.

Any and all embodiments of the present invention able to take numerous forms and implementations, including in software implementations, hardware implementations, silicon implementations, firmware implementation, or software/hardware/silicon/firmware combination implementations.

Various methods and/or means are described relative to embodiments of the present invention. In at least one embodiment of the invention, any one or each of these various means may be implemented by computer program code statements or instructions (including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products having instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

For ease of description, some or all of the indicated memory locations herein may be indicated or described to be replicated on each machine (as shown in FIG. 2A), and therefore, replica memory updates to any of the replicated memory locations by one machine, will be transmitted/sent to all other machines. Importantly, the methods and embodiments of this invention are not restricted to wholly replicated memory arrangements, but are applicable to and operable for partially replicated shared memory arrangements mutatis mutandis (e.g. where one or more memory locations are only replicated on a subset of a plurality of machines, such as shown in FIG. 2B).

Any combination of any of the described methods or arrangements herein are provided and envisaged, and to be included within the scope of the present invention.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
  (i) re-compilation at loading,
  (ii) a pre-compilation procedure prior to loading,
  (iii) compilation prior to loading,
  (iv) "just-in-time" compilation(s), or
  (v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

The above arrangements may be implemented by computer program code statements or instructions (including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another arrangement the implementation may be in firmware and in other arrangements may be in hardware. Furthermore, any one or each of these implementations may be a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore be constituted by a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system.

To summarize, there is disclosed a multiple computer system with replicated shared memory, the system comprising a multiplicity of computers each interconnected via a communications network and each executing a different portion of an applications program written to be executed on only a single computer, wherein each the computer has an independent local memory partitioned into two regions, a first one of the regions being substantially similar with corresponding memory content replicated on at least one other computer and the second of the regions not corresponding to each other.

Preferably changes to the content of replicated memory in the first region of the local memory of any one of the multiple computers are transmitted via the communications network to the corresponding replicated memory in the first region of all the other ones of the multiple computers.

Preferably additions and/or deletions to the memory locations in the first region of the local memory of any one of the multiple computers are transmitted via the communications network to the first region of all the other ones of the multiple computers whereby the partition between the first and second regions changes with time.

Preferably the first region occupies less than substantially 50% of the local memory of each the multiple computer.

Preferably the first region occupies from substantially 5% to substantially 40% of the local memory of each the computer.

Preferably the first region occupies from substantially 10% to substantially 30% of the local memory of each the computer.

Also disclosed is a method of partitioning an independent local memory of each computer of a multiple computer system comprising a multiplicity of computers each interconnected via a communications system and each executing a different portion of an applications program written to be executed on only a single computer, the method comprising the step of:

(i) for each the computer partitioning the independent local memory into two regions, a first one of the regions being substantially similar with corresponding memory content replicated on at least one other computer, and the second of the regions not corresponding to each other.

Preferably the method includes the further step of:
(ii) transmitting via the communications network changes to the replicated content of memory in the first region of the local memory of any one of the multiple computers to the corresponding replicated memory of all the other ones of the multiple computers.

Preferably the method includes the further step of:
(iii) changing the partition between the first and second region with time by transmitting via the communications network additions and/or deletions to the memory locations in the first region of the local memory of any one of the multiple computers to the first region of all the other ones of the multiple computers.

Preferably the method includes the further step of:
(iv) allocating less than substantially 50% of the local memory of each the multiple computer to the first region.

Preferably the method includes the step of:
(v) allocating from substantially 5% to substantially 40% of the local memory to the first region.

Preferably the method includes the step of:
(vi) allocating from substantially 10% to substantially 30% of the local memory to the first region.

In addition there is disclosed a single computer for operation in cooperation with an external multiple computer system with replicated shared memory, the system comprising a multiplicity of single computers each interconnected via a communications network and each executing a different portion of an applications program written to be executed on only a single computer, wherein each the single computer has an independent local memory partitioned into two regions, a first one of the regions being substantially similar with corresponding memory content replicated on at least one other computer, and the second of the regions not corresponding to each other.

Preferably changes to the replicated content of the memory in the first region of the independent local memory of the single computer are transmitted via the communications network to the corresponding memory of all the other ones of the single computers in the multiple computer system.

Preferably changes to the number of memory locations in the first region of the independent local memory of the single computer are transmitted via the communications network to the first region of all the other ones of the single computers of the multiple computer system, whereby the partition between the first and second regions changes with time.

Preferably the first region occupies less than substantially 50% of the local memory of each the single computer.

Preferably the first region occupies from substantially 5% to substantially 40% of the independent local memory.

Preferably the first region occupies from substantially 10% to substantially 30% of the local memory.

Furthermore, there is disclosed a method of partitioning local memory of a single computer operating in cooperation with a multiple computer system comprising a multiplicity of computers each interconnected via a communications network and each executing a different portion of an applications program written to be executed on only a single computer, the method comprising the step of:

(i) partitioning the local memory of the single computer in two regions, a first one of the regions being substantially similar with corresponding memory content replicated on at least one other of the computers in the multiple computer system, and the second of the regions not corresponding to each other.

Preferably the method includes the further step of:
(ii) transmitting via the communications network changes to the content of memory in the first region of the local memory of the single computer to the corresponding memory of all the other ones of the computers.

Preferably the method includes the further step of:
(iii) changing the partition between the first and second regions with time by transmitting via the communications network changes to the number of memory locations in the first region of the local memory of the single computer to the first region of all the other ones of the computers in the multiple computer system.

Preferably the method includes the further step of:
(iv) allocating less than substantially 50% of the local memory of each the computer to the first region.

Preferably the method includes the further step of:
(v) allocating from substantially 5% to substantially 40% of the independent local memory to the first region.

Preferably the method includes the further step of:
(vi) allocating from substantially 10% to substantially 50% of the independent local memory to the first region.

In addition there is disclosed a multiple computer system with replicated shared memory, the system comprising a multiplicity of computers each interconnected via a communications network and each executing a different portion of an applications program written to be executed on only a single computer, wherein each the computer has an independent local memory partitioned into an allocated application memory, the allocated application memory being further partitioned into two regions, a first one of the regions comprising application memory contents replicated in at least one other of the computers, and the second of the regions comprising application memory contents not replicated in any other of the computers.

Preferably changes to the replicated content of memory in the first region of the allocated application memory of any one of the multiple computers are transmitted via the communications network to the corresponding replicated memory in the first region of at least one other of the multiple computers.

Preferably additions and/or deletions to the memory locations in the first region of the allocated application memory of any one of the multiple computers are transmitted via the communications network to the first region of at least one other of the multiple computers whereby the partition between the first and second regions changes with time.

Preferably the first region occupies less than substantially 50% of the allocated application memory of each the multiple computer.

Preferably the first region occupies from substantially 5% to substantially 40% of the allocated application memory of each the computer.

Preferably the first region occupies from substantially 10% to substantially 30% of the allocated application memory of each the computer.

Still further there is disclosed a method of partitioning an independent local memory of each computer of a multiple computer system comprising a multiplicity of computers each interconnected via a communications system and each executing a different portion of an applications program written to be executed on only a single computer, the method comprising the step of:
(i) for each the computer partitioning the independent local memory into an allocated application memory, the allocated application memory being further partitioned into two regions, a first one of the regions comprising application memory contents replicated in at least on other of the computers, and the second of the regions comprising application memory contents not replicated in any other of the computers.

Preferably the method includes the further step of:
(ii) transmitting via the communications network changes to the replicated content of memory in the first region of the allocated application memory of any one of the multiple computers to the corresponding replicated memory of at least one other of the multiple computers.

Preferably the method includes the further step of:
(iii) changing the partition between the first and second region with time by transmitting via the communications network additions and/or deletions to the memory locations in the first region of the allocated application memory of any one of the multiple computers to the first region of at least one other of the multiple computers.

Preferably the method includes the further step of:
(iv) allocating less than substantially 50% of the allocated application memory of each the multiple computer to the first region.

Preferably the method includes the step of:
(v) allocating from substantially 5% to substantially 40% of the allocated application memory to the first region.

Preferably the method includes the step of:
(vi) allocating from substantially 10% to substantially 30% of the allocated application memory to the first region.

Further still there is disclosed a single computer for operation in cooperation with an external multiple computer system with replicated shared memory, the system comprising a multiplicity of single computers each interconnected via a communications network and each executing a different portion of an applications program written to be executed on only a single computer, wherein each the single computer has an independent local memory partitioned into an allocated application memory, the allocated application memory further partitioned into two regions, a first one of the regions comprising application memory contents replicated in at least one other of the computers, and the second of the regions comprising application memory contents not replicated in any other of the computers.

Preferably changes to the replicated content of the memory in the first region of the allocated application memory of the single computer are transmitted via the communications network to the corresponding memory of at least one other of the single computers in the multiple computer system.

Preferably changes to the number of memory locations in the first region of the allocated application memory of the single computer are transmitted via the communications network to the first region of at least one other of the single computers of the multiple computer system, whereby the partition between the first and second regions changes with time.

Preferably the first region occupies less than substantially 50% of the allocated application memory of each the single computer.

Preferably the first region occupies from substantially 5% to substantially 40% of the allocated application memory.

Preferably the first region occupies from substantially 10% to substantially 30% of the allocated application memory.

Also disclosed is a method of partitioning local memory of a single computer operating in cooperation with a multiple computer system comprising a multiplicity of computers each interconnected via a communications network and each executing a different portion of an applications program written to be executed on only a single computer, the method comprising the step of:
(i) partitioning the local memory of the single computer into an allocated application memory, the allocated application memory further partitioned into two regions, a first one of the regions comprising application memory contents replicated in at least one other of the computers in the multiple computer system, and the second of the regions comprising application memory contents not replicated in any other of the computers in the multiple computers system.

Preferably the method includes the further step of:
(ii) transmitting via the communications network changes to the content of memory in the first region of the allocated application memory of the single computer to the corresponding memory of all the other ones of the computers.

Preferably the method includes the further step of:
(iii) changing the partition between the first and second regions with time by transmitting via the communications network changes to the number of memory locations in the first region of the allocated application memory of the single computer to the first region of all the other ones of the computers in the multiple computer system.

Preferably the method includes the further step of:
(iv) allocating less than substantially 50% of the allocated application memory of each the computer to the first region.

Preferably the method includes the further step of:
(v) allocating from substantially 5% to substantially 40% of the allocated application memory to the first region.

Preferably the method includes the further step of:
(vi) allocating from substantially 10% to substantially 50% of the allocated application memory to the first region.

The term "comprising" (and its grammatical variations) as used herein is used in the inclusive sense of "having" or "including" and not in the exclusive sense of "consisting only of".

I claim:

1. A multiple computer system with replicated shared memory, said system comprising:
   a multiplicity of computers each interconnected via a communications network and each executing a different portion of an applications program written to be executed on only a single computer,
   wherein each said computer has an independent local memory partitioned into two regions, a first one of said regions having content corresponding to corresponding memory content replicated on at least one other computer, and the second of said regions not corresponding to each other,
   wherein changes to the content of replicated memory in the first region of the local memory of any one of said multiple computers are transmitted via said communications network to the corresponding replicated memory in the first region of all the other ones of said multiple computers,
   wherein additions and/or deletions to the memory locations in the first region of the local memory of any one of said multiple computers are transmitted via said communications network to the first region of all the other ones of said multiple computers whereby the partition between said first and second regions changes with time.

2. The system of claim 1, wherein said first region occupies less than substantially 50% of the local memory of each said multiple computer.

3. The system as in claim 2, wherein said first region occupies from substantially 5% to substantially 40% of the local memory of each said computer.

4. The system as in claim 3, wherein said first region occupies from substantially 10% to substantially 30% of the local memory of each said computer.

5. A method of partitioning an independent local memory of each computer of a multiple computer system comprising a multiplicity of computers each interconnected via a communications system and each executing a different portion of an applications program written to be executed on only a single computer, said method comprising the step of:
   (i) for each said computer partitioning the independent local memory into an allocated application memory, said allocated application memory further partitioned into two regions, a first one of said regions comprising application memory contents replicated in at least on other of said computers, and the second of said regions comprising application memory contents not replicated in any other of said computers,
   (ii) transmitting via said communications network changes to the replicated content of memory in the first region of the allocated application memory of any one of said multiple computers to the corresponding replicated memory of at least one other of said multiple computers, and
   (iii) changing the partition between said first and second region with time by transmitting via said communications network additions and/or deletions to the memory locations in the first region of the allocated application memory of any one of said multiple computers to the first region of at least one other of said multiple computers.

6. The method of claim 5, further comprising:
   (iv) allocating less than substantially 50% of the allocated application memory of each said multiple computer to said first region.

7. The method as in claim 6, including the step of:
   (v) allocating from substantially 5% to substantially 40% of said allocated application memory to said first region.

8. The method as in claim 7, including the step of:
   (vi) allocating from substantially 10% to substantially 30% of said allocated application memory to said first region.

* * * * *